US008730547B2

(12) United States Patent
Chen et al.

(10) Patent No.: US 8,730,547 B2
(45) Date of Patent: May 20, 2014

(54) LATTICE-BASED SCREEN DESIGN FOR N-COLOR ALL-ORDERS MOIRE-FREE SCREEN SET

(75) Inventors: Yung-Yao Chen, West Lafayette, IN (US); Tamar Kashti, Rehovot (IL); Jan Allebach, West Lafayette, IN (US); Carl Staelin, Haifa (IL); Mani Fischer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 13/540,898

(22) Filed: Jul. 3, 2012

(65) Prior Publication Data

US 2014/0009770 A1 Jan. 9, 2014

(51) Int. Cl.
  *H04N 1/52* (2006.01)
  *H04N 1/58* (2006.01)

(52) U.S. Cl.
  USPC .......................................... 358/533; 358/536

(58) Field of Classification Search
  None
  See application file for complete search history.

(56) References Cited

U.S. PATENT DOCUMENTS

| 7,221,479 | B2 | 5/2007 | Wen |
| 7,675,651 | B2 | 3/2010 | Wang et al. |
| 7,679,787 | B2* | 3/2010 | Wang et al. ................... 358/3.06 |
| 7,839,537 | B2 | 11/2010 | Tai et al. |
| 7,898,692 | B2 | 3/2011 | Wang et al. |
| 7,933,044 | B2 | 4/2011 | Wang |
| 8,355,189 | B2* | 1/2013 | Shacham et al. .............. 358/533 |
| 8,472,081 | B2* | 6/2013 | Shacham et al. ............. 358/3.06 |
| 2009/0296122 | A1 | 12/2009 | Broddin et al. |
| 2011/0038008 | A1 | 2/2011 | Wang et al. |
| 2012/0188611 | A1* | 7/2012 | Shacham et al. ............. 358/3.06 |

OTHER PUBLICATIONS

Amidror et al.; "Spectral Analysis and Minimization of Moiré Patterns in Colour Separation; Journal of Electronic Imaging"; 3(3), pp. 295-317; 1994.
Wang and R.P. Loce; "Uniform-Rosette Color Halftoning for N-Color Moiré-Free Printing" J. of Electronic Imaging, vol. 17, No. 2, pp. 023003-1-023003-16, Apr.-Jun. 2008.
Wang; "Uniform Rosette for Moiré-Free Color Halftoning" Proc. SPIE, Color Imaging XII: Processing, Hardcopy, and Applications, vol. 6493, pp. 64931E-1-64931E-11, Jan. 2007.
Chen et al.; The Octagon Screen Set: A Square N-Color High-Order Moiré-Free Screen Set; Proc. of SPIE, vol. 8292, Jan. 24-26, 2012.

* cited by examiner

*Primary Examiner* — Scott A Rogers

(57) ABSTRACT

A method and system to generate a moiré-free to all-orders N-color screen-set by a lattice-based screen design the method including choosing a lattice in frequency space with basis vectors u1 and u2 such that $(\|\vec{u}1\|, \|\vec{u}2\|, \|\vec{u}1 \pm \vec{u}2\|) > f$ min, where f min is the minimum moiré invisible to the human eye, and choosing a set of N pairs of fundamental frequency vectors on the vertices of this lattice to be the screen vectors.

20 Claims, 18 Drawing Sheets

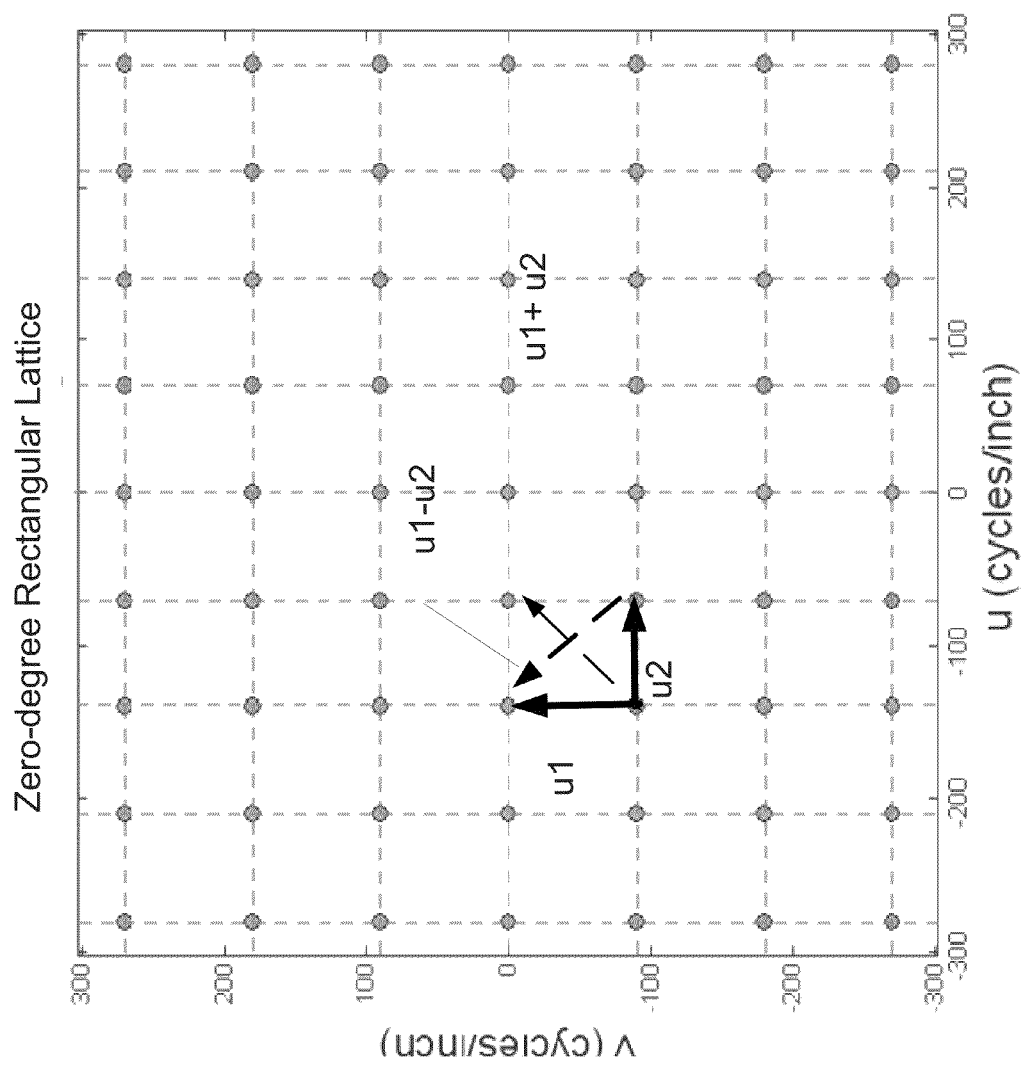

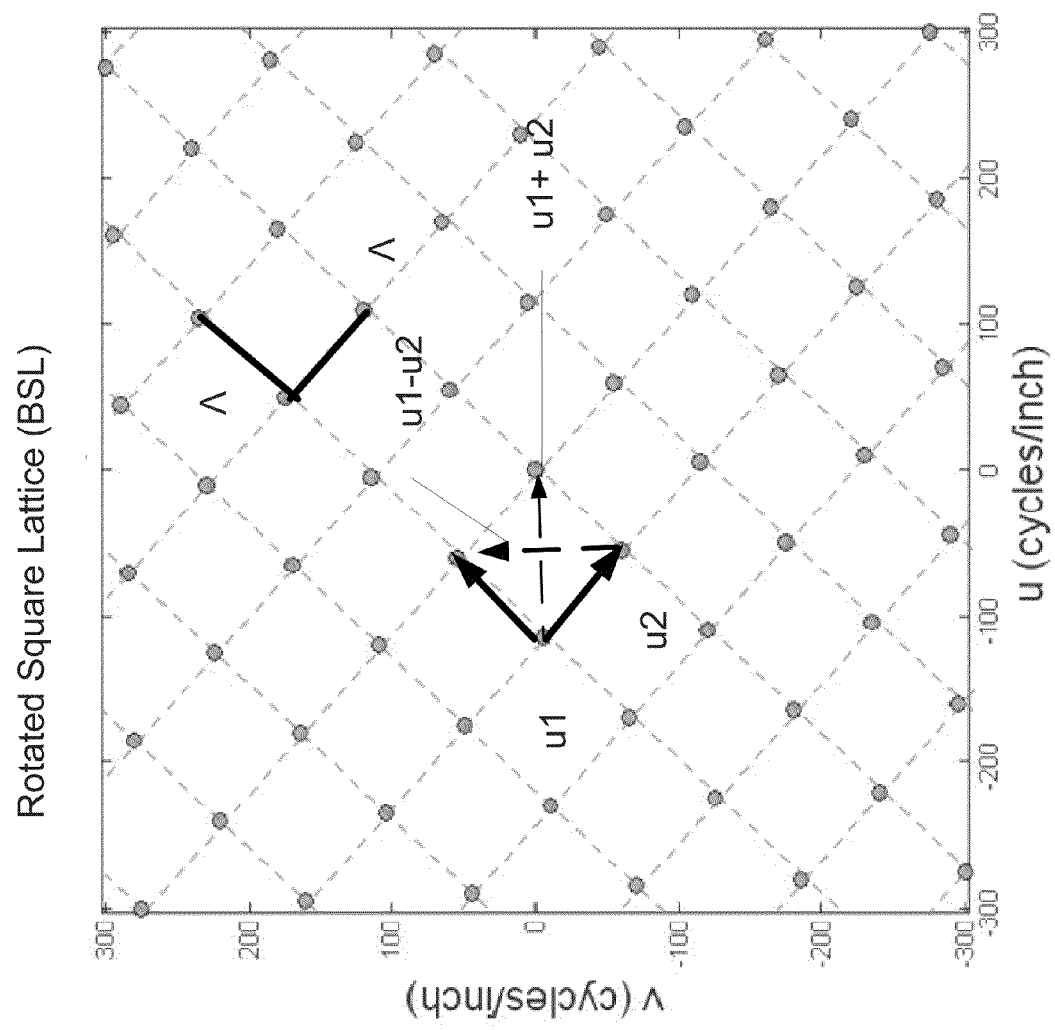

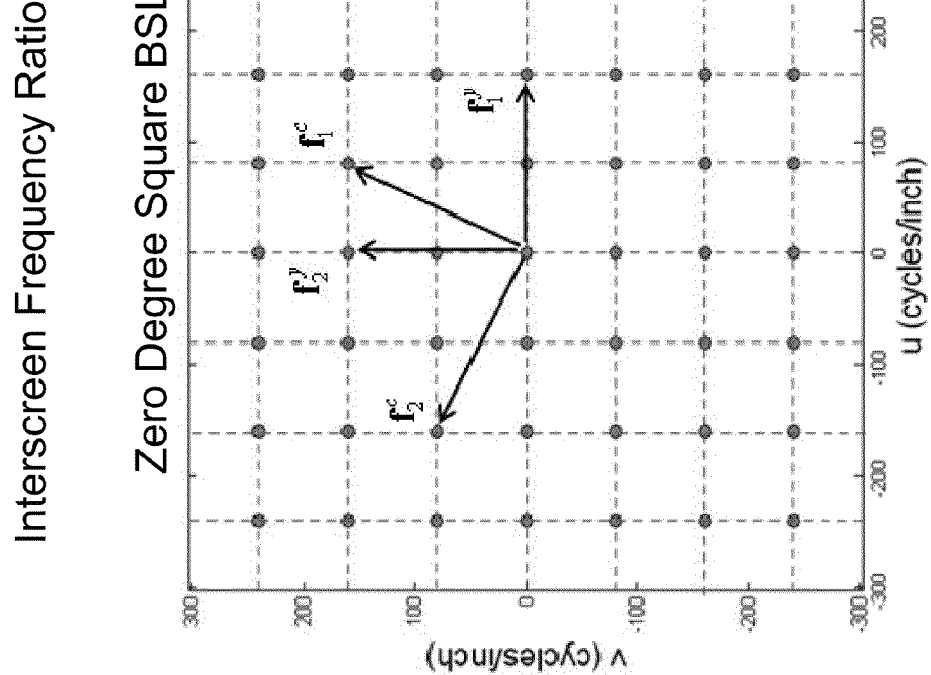

LATTICE-BASED SCREEN DESIGN FOR N-COLOR ALL-ORDERS MOIRÉ-FREE SCREEN SET

BACKGROUND

Halftoning is a technique that simulates continuous tone imagery through the use of spots, varying either in size, shape or spacing. Halftoning exploits a property that the human visual system (HVS) is not as sensitive to high spatial frequency patterns. The pattern of the spots in halftoning is called the screen. In amplitude modulation (AM) halftoning, periodic cluster-dot screens are widely used for electro-photographic printers due to their print stability and low computational load and robustness to printer artifacts, but they are limited in angles and periodicity due to moiré patterns.

The traditional solution in the graphic arts and printing industry to deal with moirépatterns is to rotate identical square screens to angles that are maximally separated from each other. However, the effectiveness of this approach may be limited when printing with more than four colorants, i.e. N-color printing, where N>4. Moreover, accurately achieving the angles that have maximum angular separation may also be difficult for a digital printer, due to the relatively low resolution.

BRIEF DESCRIPTION OF THE DRAWINGS

Examples of the present invention are described in the following detailed description and illustrated in the accompanying drawings in which:

FIG. 1d is a schematic representation of a zero-rotation rectangular lattice (BSL) in frequency space, according to an example;

FIG. 1e is a schematic representation of a rotated square lattice (BSL) in frequency space, according to an example;

FIG. 6a is a schematic illustration of a zero frequency square BSL depicting an interscreen frequency ratio, according to an example;

Figure 1A:
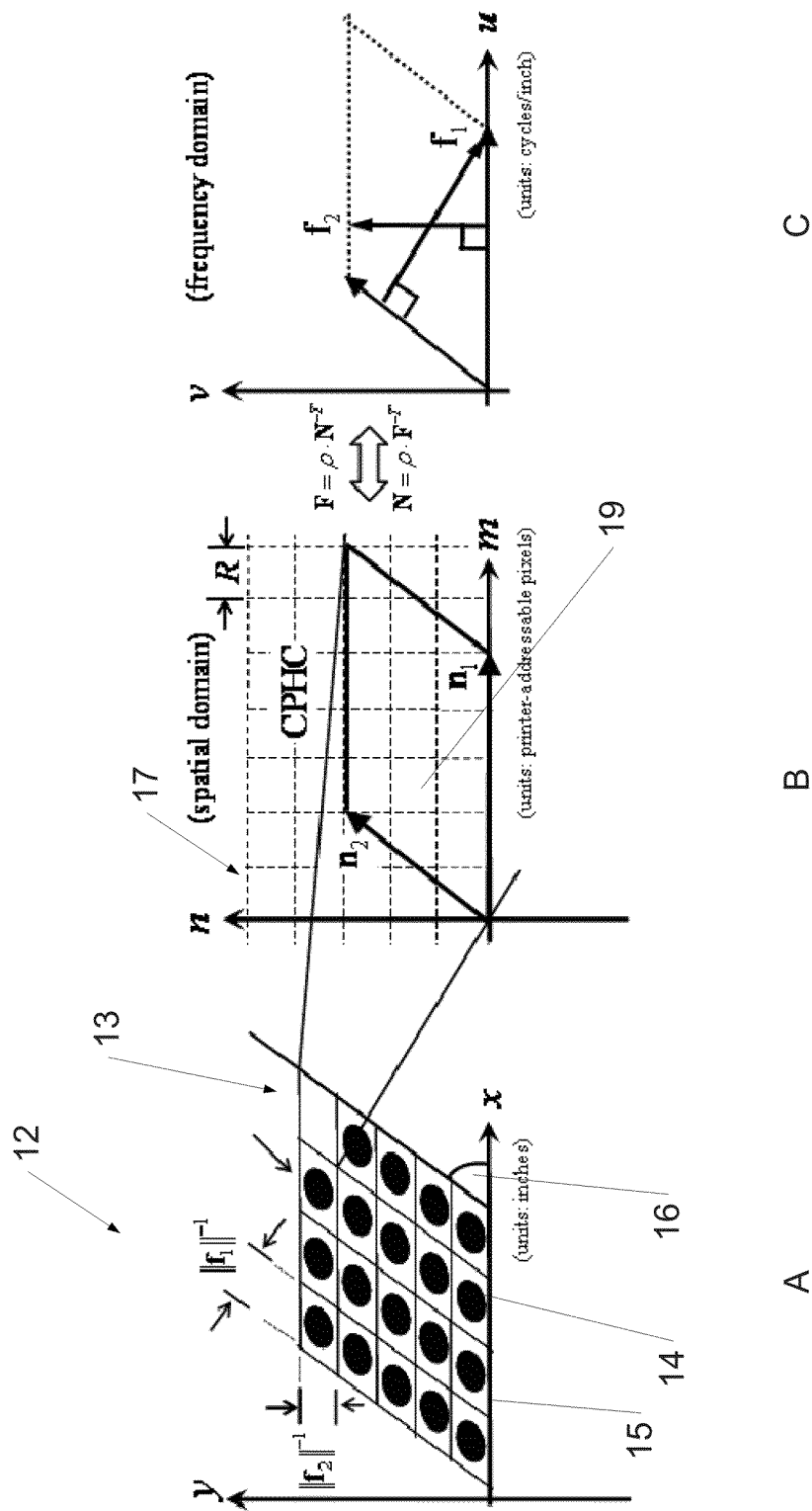
FIG. 1a is a schematic representation of a screen in spatial and frequency domain, according to an example.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the methods and apparatus. However, it will be understood by those skilled in the art that the present methods and apparatus may be practiced without these specific details. In other instances, well-known methods, procedures, and components have not been described in detail so as not to obscure the present methods and apparatus.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulates, executes and/or transforms data represented as physical, such as electronic, quantities within the computing system's registers and/or memories into other data similarly represented as physical quantities within the computing system's memories, registers or other such information storage, transmission or display devices.

FIG. 1a is a schematic representation of a halftone screen represented in the spatial and frequency domains, according to an example This representation is accurate for both orthogonal and non-orthogonal screens. The figure illustrates that there exists a one-to-one relationship between a pair of screen tile vectors and a pair of fundamental frequency vectors when the printer resolution is given.

Part A of FIG. 1a depicts a schematic illustration of a cell grid 13, the grid divided into cells 15, each cell 15 containing a printed spot or cluster. In part A, the units along the X and Y axis are in inches. The width of each cell in the grid may be related to the vectors in the frequency domain, described below.

In some examples, $\|f_2\|^{-1}$ may be equal to the height of cell 15 and $\|f_1\|^{-1}$ will be equal to the width of cell 15.

Part B of FIG. 1a depicts a schematic representation of a single cell, e.g., cell 15, the cell laid out on a laser grid 17, where each cell in the laser grid represents a pixel 19 and where R is the width of each pixel. Vectors n1 and n2 are measured in units of printer-addressable pixels; the units of fundamental frequency vectors f1 and f2 are measured in cycles-per-inch. $\rho=1/R$ is printer resolution in units of printer-addressable dots-per-inch.

Halftone screen 12 has a screen angle 16 and may be composed of smaller dot clusters. A schematic illustration of an exemplary dot cluster 14 is represented in the spatial domain A on a graph with axes, x and y. Screening may determine the halftone output by thresholding the discrete space continuous tone image with a threshold array. The threshold array of a periodic screen may be defined as spatially periodic according to two linearly independent vectors, in AM screens, screen vectors $n_1$ and $n_2$.

The screen matrix N, as represented in the spatial domain, may be defined by $N=[n_1|n_2]$. The units in the graph may be printer-addressable pixels.

In some examples, e.g. in part C of FIG. 1a, a halftone screen may be represented in the frequency domain, where the units are typically in lines per inch.

Frequency matrix F, the representation of the halftone screen in the frequency domain, where $F=[f_1|f_2]$, may defined as the Fourier transform of the screen matrix N. In some instances, there is a one-to one relationship between F and N which is $$F = \rho \cdot N^{-T}$$

and/or $$N = \rho \cdot F^{-T}$$

where $\rho$ is the printer resolution in dots per inch.

In some examples, $f_1$ and $f_2$ are linearly independent vectors, where $|f_1|=|f_2|$, and are sometimes referred to as fundamental frequency vectors. Typically, the screen frequency may be defined as the spatial frequency of each halftone cell in two directions, and the screen angle 16 may be defined as the angle between $n_1$ and the x axis.

In the case where the angle between $n_1$ and $n_2$ is 90 degrees and $\rho$ is fixed, $\|f_1\|$ may be determined by $\|n_1\|$ according to an equation, where:

$$\|f_1\| = \frac{\rho}{\|n_1\|}$$

Figure 1B:
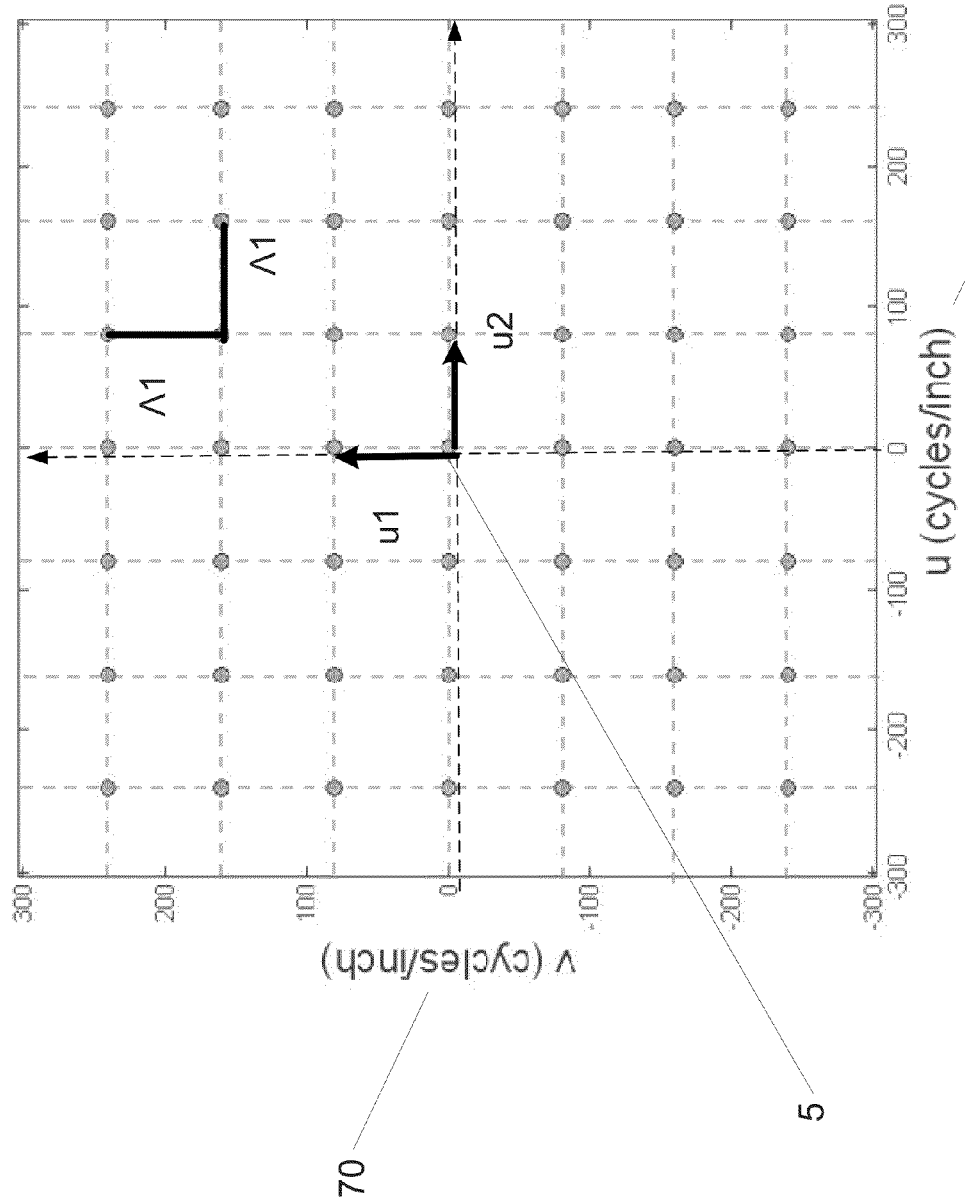
FIG. 1b is a schematic representation of a zero-rotation (non-rotated) square basis spectral lattice (BSL) in frequency space with lattice size Λ1, according to an example.

FIG. 1b is a schematic representation of a basis spectral lattice (BSL) 20 in frequency space with lattice size $\Lambda 1$, which is above the minimum permissible moiré frequency. $\Lambda 1$ may be set in units of lines-per-inch (LPI).

FIG. 1b depicts a non-rotated, square basis spectral lattice (BSL). This may be one of many possible examples of the different types of basis spectral lattices that may be used to design halftone screens. Others include a non-rotated rectangular lattice (FIG. 1d), a rotated, square lattice (FIG. 1e), and a more general, e.g., parallelogram, lattice (FIG. 1f) that is different from the previous cases. For simplicity and ease of discussion, but without any loss of generality, the discussion in the remainder of this description will focus primarily on the use of a non-rotated, square BSL for halftone screen design. It will be appreciated by a person of ordinary skill in the art, that the concepts to be revealed herein may readily be extended to the other types of BSLs, of which examples are presented above.

In some examples, employing basis spectral lattice (BSL) 20, under conditions described herein results in a print that may be moiré free to all orders.

A method to design different moiré-free halftone geometry configurations may be employed as described below. There are two or more steps in designing moiré-free halftone screens within a screen set. In some examples, the screen set is configured to be printed digitally. In some examples, the screen set may be configured to be printed via an offset printing mechanism In creating the screen, at least one step requires the use of the frequency domain to represent the halftone screen, which is in the spatial domain. In the spatial domain, the vectors may be measured in units of printer-addressable pixels. In the frequency domain, the vectors may be presented in units of lines per inch (LPI), or cycles per inch.

In some instances, the frequency domain may have two axes, a u axis 70 and a v axis 80, and may be divided into quadrants around an origin 5 (i.e., 0, 0), two quadrants in the upper plane, i.e., above 0 on the v axis, and two quadrants in the lower plane, i.e., below origin 5 on the v axis.

In some examples, the distance between individual points on the lattice may be measured, in frequency space, in units of LPI on both the v axis and the u axis.

In some examples, color screen sets for halftone printing may be designed as periodic, clustered-dot screens that provide control of moiré properties of the resulting screens when used in color printing.

In basis spectral lattice (BSL) 20, the individual points within the lattice may be spanned by the basis vectors u1 and u2. The minimum frequencies of the BSL 20 are |u1|, |u2|, |u1+u2| and |u1−u2|, as depicted herein below in, for example, FIGS. 1d, 1e and 1f. These frequencies may be larger than a minimum permissible moiré frequency f min, which, in some examples, may be chosen to be the maximum frequency seen by the average human viewer. This may result in a screen-set that is free of visible moiré.

In some examples, in a square BSL 20, there may be one frequency $\Lambda$, which may be larger than a minimum permissible moiré frequency f min, as described above.

In some examples, u1 and u2 may be perpendicular to each other. In some examples, u1 and u2 are not perpendicular to each other. In some examples, u1 and u2 may be vectors that span the lattice, and need not extend in a vertical and/or horizontal direction.

Each of the frequency vectors on the lattice may be a linear combination of u1 and u2, where:

$$f_i^\chi = a_i^\chi u_1 b_i^\chi u_2$$

Here a and b are integers. the superscript $\chi$ denotes the specific color plane to which the screen will be applied, for example, C, M, Y, K for cyan, magenta, yellow, and black, and the subscript i=1 or 2, corresponds to whether this is the first or second one of the two frequency vectors that define the color plane screen.

Figure 1C:
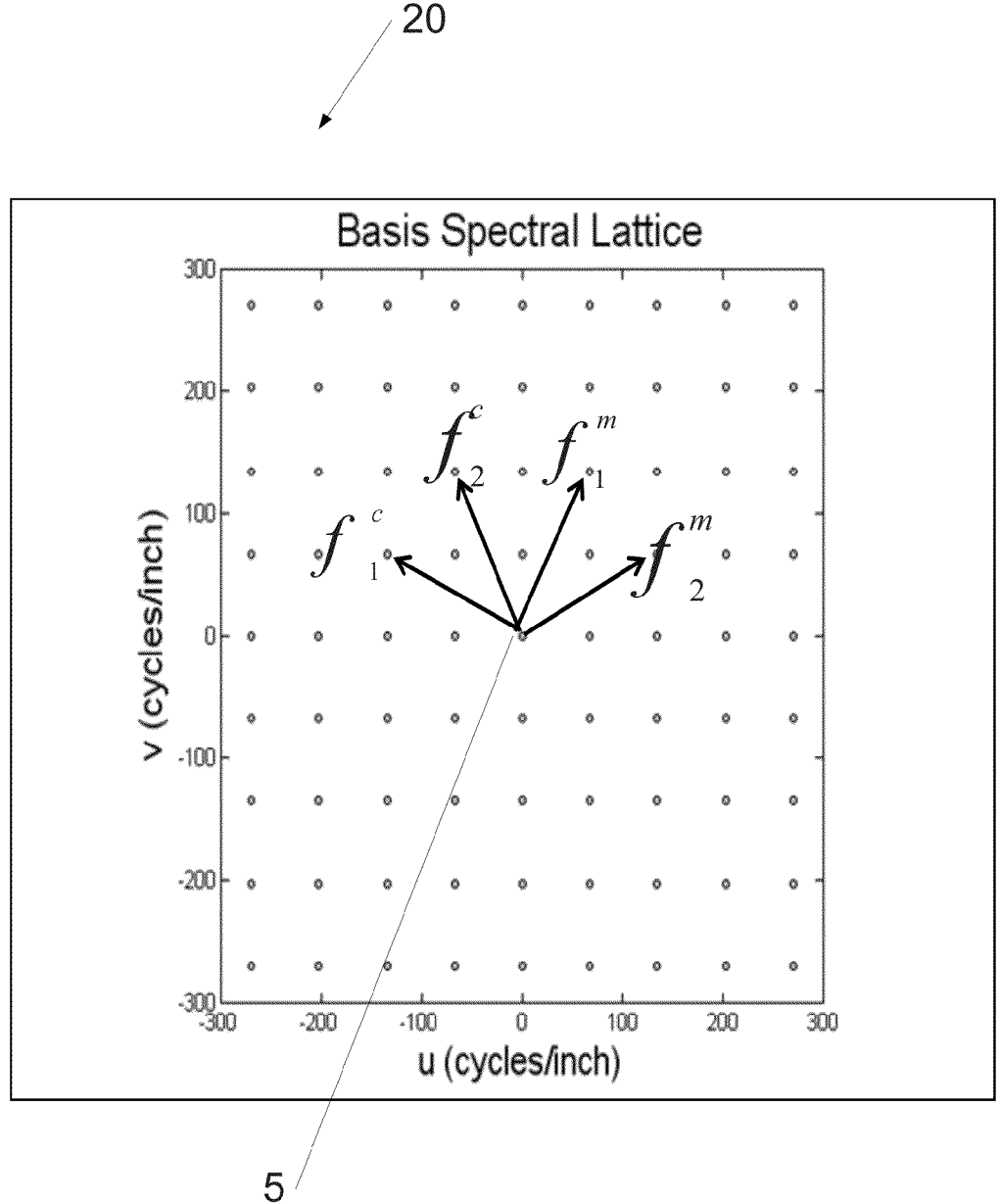
FIG. 1c is a schematic representation of a zero-rotation square basis spectral lattice (BSL) in frequency space with vectors representing two colorants planes of 2 screens, according to an example.

FIG. 1c is a schematic illustration of a frequency space illustration of two screens, magenta (m) and cyan (c) when each cell in BSL 20 is a square and u1 and u2 have a frequency $\Lambda$. The relationship between the basis vectors and the screen vectors may be further represented as a matrix:

$$\begin{pmatrix} \vec{f}_1^x \\ \vec{f}_2^x \end{pmatrix} = M_\chi U = \begin{pmatrix} m_1 & m_3 \\ m_2 & m_4 \end{pmatrix} \begin{pmatrix} \vec{u}_1 \\ \vec{u}_2 \end{pmatrix}$$

FIG. 1d is a schematic representation of zero-degree rectangular lattice (BSL) in frequency space. When each cell in BSL 20 is a rectangle, u1 and u2 may have a frequency Λ1 and Λ2 respectively.

FIG. 1e is a schematic representation of rotated square lattice (BSL) in frequency space. When each cell in BSL 20 is a square, u1 and u2 may each have a frequency Λ.

Figure 1F:
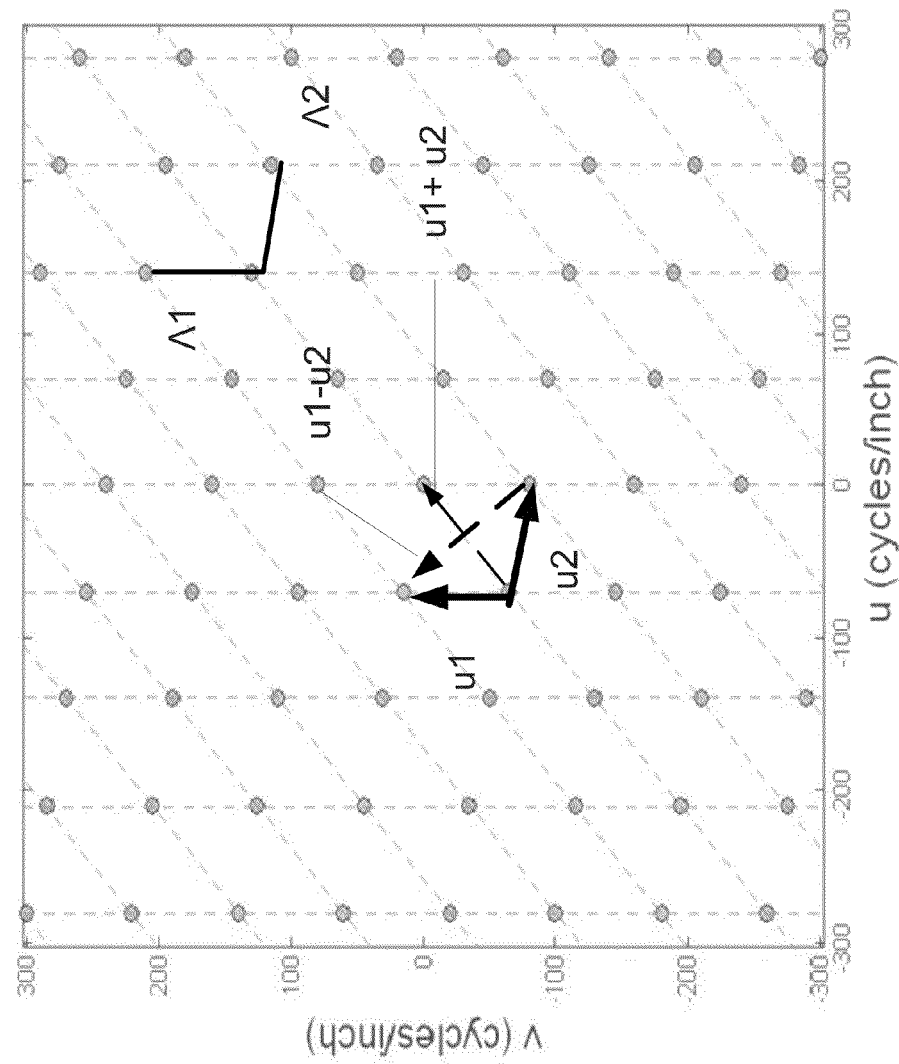
FIG. 1f is a schematic representation of a parallelogram lattice (BSL) in frequency space, according to an example.

FIG. 1f is a schematic representation of parallelogram lattice (BSL) in frequency space. When each cell in BSL 20 is a parallelogram, u1 and u2 may have a frequency Λ1 and Λ2 respectively.

Figure 2:
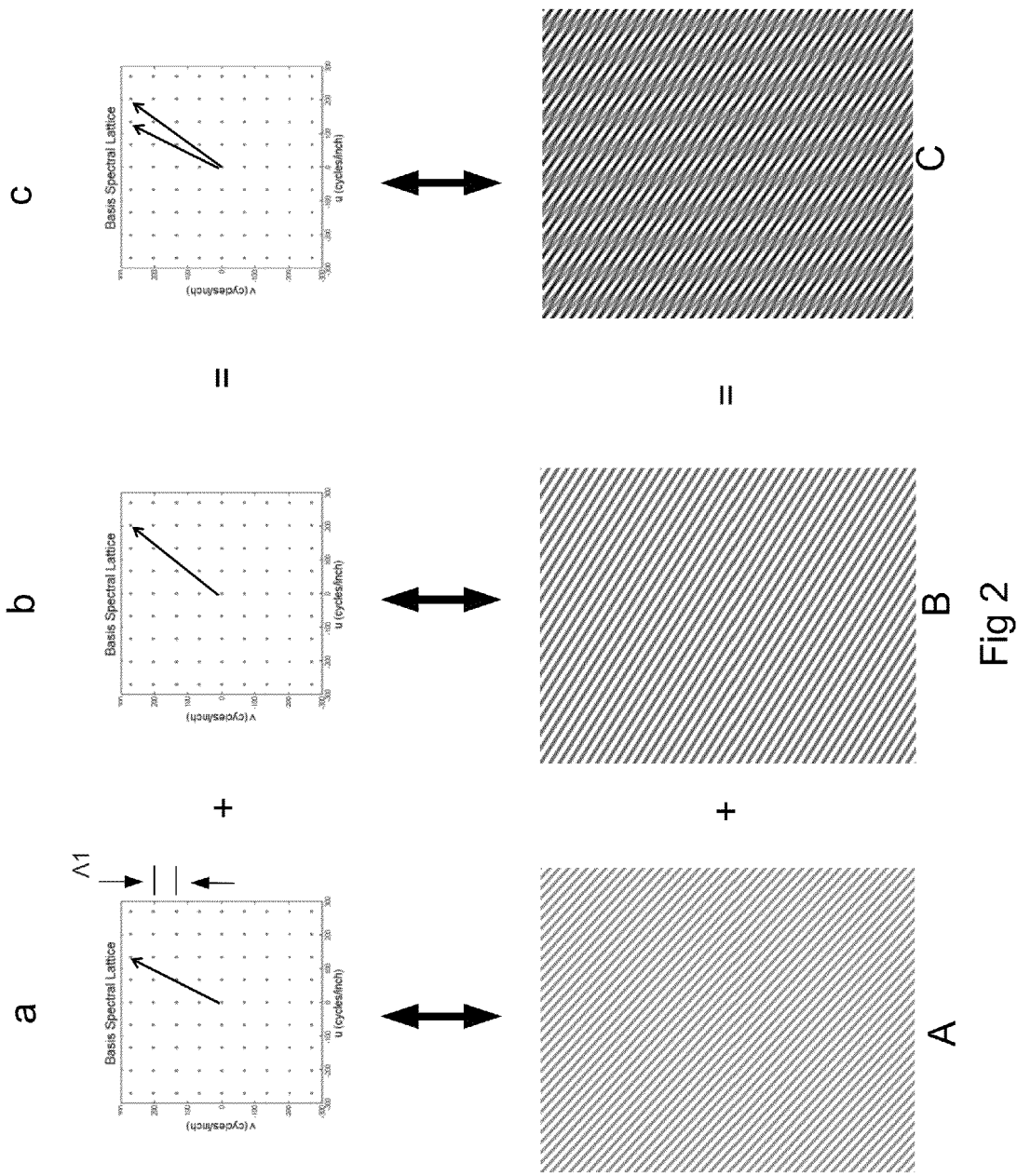
FIG. 2 is a schematic illustration of 2 grids and their overlap, the moiré effect, both in frequency space and in the spatial domain, according to an example

FIG. 2 is a schematic illustration of the moiré effect which is caused by a superposition of two grids, in both spatial domain and frequency domain. The schematic illustration shows a frequency-domain representation of a 2-color screen set (C and M) given screen tile vectors (in units of printer-addressable pixels) and printer resolution (in units of dots-per-inch, dpi).

In some examples, a particular screen in a screen set may be transformed to the frequency space, as described above and below.

In frequency space, each screen in a screen set may be depicted as a set of vectors, in some instances, a set of two vectors. The vectors in frequency space may be constrained by a BSL 20, in some examples, a periodic lattice, wherein any linear combination of vectors may remain on the lattice, including multiple multi-colored combinations of screen elements, resulting in a moiré-free to all orders screen-set.

Each colorant screen represented by vectors in the frequency domain, which may, in some instances, extend from an origin 5 on BSL 20, as described above, into the upper half of BSL 20 may be constrained by a geometry, here depicted as a bounding polygon. In some examples, the bounding polygon may be an octagon. In some examples, the bounding polygon may be any shape. In some examples, a bounding polygon may not be employed in creating a screen set.

In some examples, control of the spectral geometry, may include designing a bounding polygon on the fixed BSL first, where the ratio of the length of the radial axes of the bounding polygon to Λ1 may be in the range of 2 to 5, where Λ1 may be, in some examples, larger than the minimum permissible moiré frequency.

The bounding polygon may, in some instances, provide only one way to guide the design of N-color moiré-free screen sets. Other ways to guide the design of N-color moiré-free screen sets are also possible. In some examples, a bounding polygon is not used. In some examples, the lattice based screen may be a non-orthogonal lattice-based screen.

Each vector, here depicted as the vectors for cyan $f_1^c$ and $f_2^c$, and vectors for magenta $f_1^m$ and $f_2^m$ extend from origin 5 in increments, wherein each increment extends to the next point in a direction away from origin 5.

Each vector may be expressed as a linear combination with integer coefficients of the lattice basis vectors u1 and u2.

In some examples, the vectors may be constrained by the bounding polygon. In some examples, the vectors do not conform to any bounding polygon. When constrained, the heads of the vectors may reach the edges of the bounding polygon. In some examples, when not constrained, there may be no bounding polygon.

In FIG. 2, Λ1, in some instances defined as the distance between the lines, each demarcated by one of two opposing arrows on the figure, may be the lower bound of the lengths of all "non-zero" vectors in frequency-space. In some examples, Λ1 may be predefined, e.g., Λ1=67.7 lines per inch (LPI).

In the figure, a, b and c represent vectors within frequency domain. A, B and C are examples of grids in spatial domain, that may be line-screens (i.e., screens that are described by one vector instead of two), given their transformation in frequency space. In FIG. 2, A and B are line gratings. In this example, a and b are the frequency-domain representations of A and B. Thus, when these two example line gratings are superposed (as shown in C), in the frequency domain a horizontal frequency vector from first-order Fourier analysis may be evident. In some examples, if this new frequency vector is a low-frequency vector, it may be visible as moiré under a normal viewing distance.

FIG. 2, depicts vectors describing the screen sets of two colorants, cyan and magenta in frequency space, and the resulting screen set in the spatial domain. If the lattice spacing is larger than the highest visible frequency, this may result in invisible moiré patterns to all orders.

In lattice a, the colorant cyan is described by the vector $\vec{f_c}$ where vector $\vec{f_c}$=(2Λ1, 4Λ1). In the discussion that follows, all numbers have units of cycles per inch. In this example, Λ1=67.7 so $\vec{f_c}$=(135.4, 270.8). The result of printing cyan with this screen set can be viewed in spatial domain A In lattice b, colorant magenta may be described by the vector $\vec{f_m}$, where vector $\vec{f_m}$=(3Λ1, 4Λ1). In this example, Λ1=67.7 so $\vec{f_m}$=(203.1, 270.8). The result of printing cyan with this screen set can be viewed in spatial domain B Subtracting the two screen sets in the frequency domain, $\Delta\vec{f}=\vec{f_c}-\vec{f_m}=(2\ \Lambda1\ 4\ \Lambda1)-(3\ \Lambda1, 4\ \Lambda1)$; which in this example wherein Λ1=67.7, $\Delta\vec{f}$ (135.4, 270.8)−(203.1, 270.8)=(−67.7, 0). The result of the overlay of spatial domains A and B as depicted above as $\Delta\vec{f}$ can be viewed visually in spatial domain C.

$\Delta\vec{f}$ may correspond to the moiré effect, e.g., the repeating structure as seen in spatial domain C. Therefore, in designing BSL 20, Λ1, as described above should be greater than the minimum perceived moiré effect such that $\Delta\vec{f}$ will result in a value greater than the minimum perceived moiré effect.

Figure 3A:
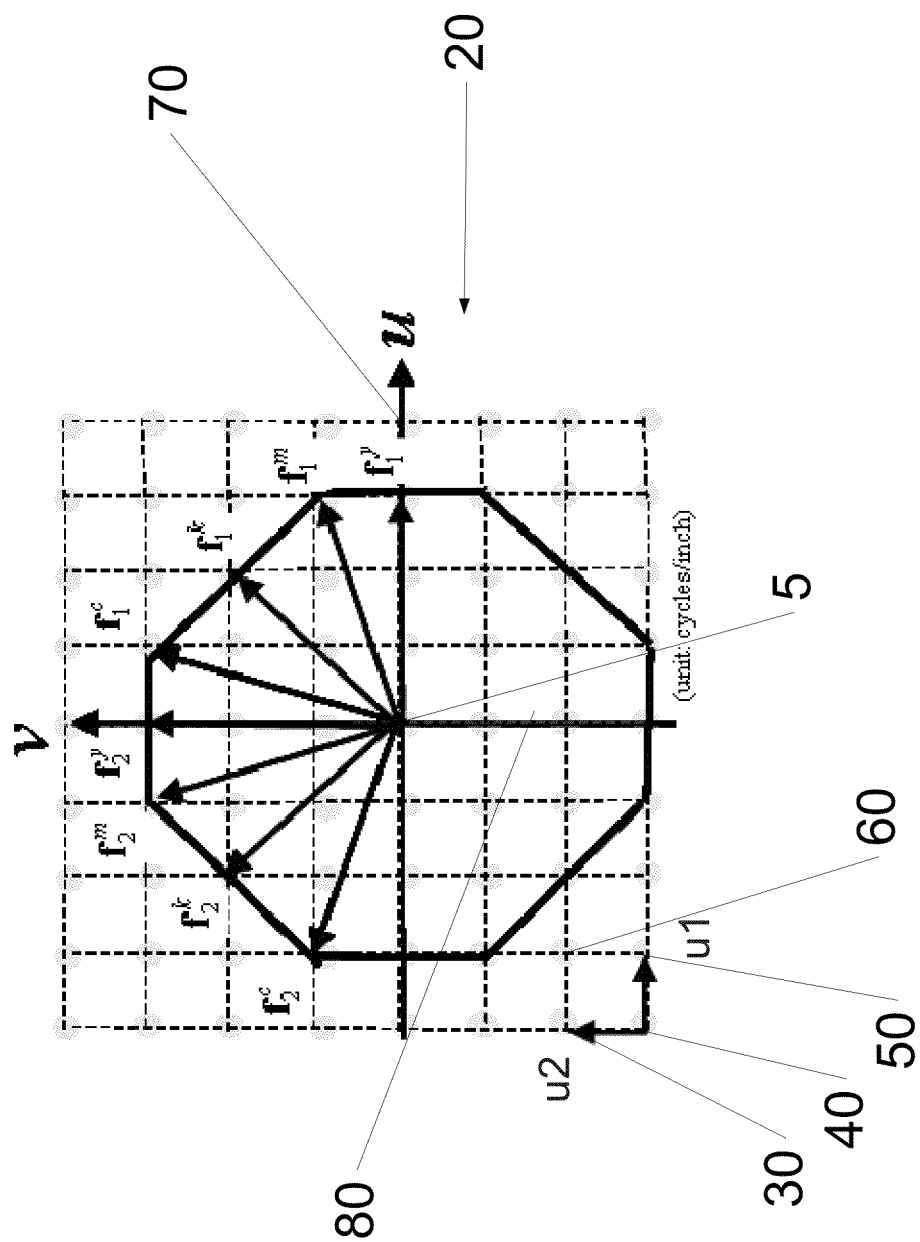
FIG. 3a is a schematic representation of a screen set of four colorants represented in frequency space on a basis spectral lattice, according to an example.

FIG. 3a is a schematic illustration of a proposed screen set of 4 colorants that may be defined by two basis frequency vectors fb1 and fb2, which define the minimum permissible moiré Λ1 In this example, the tips of the screen vectors are constrained to lie on the vertices of a bounding polygon. In some examples, the bounding polygon may make the screens more symmetric. In some examples, the bounding polygon is not a limitation in designing the screens.

The output of the screening process may, in some instances, be a pattern of multiple small dots, which may be regularly spaced as determined by the addressability of an imaging system. A regular screen may be a screen with all cell centers on centers of printer pixels, so that all the dot clusters have the same shape. In some examples, the screen may be irregular, in which case the dot clusters 14 have varied shapes with centers not necessarily on the centers of printer pixels 19.

The dots may be clustered within a cell, the alignment of the clusters of dots via the halftone cell tiling defines the geometry of the halftone screen—this halftone geometric structure is, in some examples, a 2D repeated pattern that contains two fundamental spatial frequencies that may be determined by the geometry of the halftone screen.

In some examples, the halftone cell is replicated and tiled across the entire image plane to form a screen that is applied to the image. This 2D spatially periodic function that defines the halftone screen can be described by two fundamental frequency vectors. When analyzing the frequency vectors in building the screens, the amplitude and phase of each of the component screens are ignored.

In some examples, most color halftoning may be done using the CMYK four color printing set, where C is cyan, M is magenta, Y is yellow and K is black. However, in some printing, additional colors may be used, as discussed below.

In some examples, a proposed screen set, described by two-dimensional vectors in the frequency domain, each representing one of the CMYK primaries colors is laid out on BSL 20.

BSL 20 in frequency domain, may be constructed from points—each point, in some instances, equidistant from its neighbor when the lattice is a square lattice.

Point 40, an exemplary point, may have two neighbors, point 30 and point 50. The distance of from point 40 to point 30 is defined as u2 where distance u2 is in LPI. The distance from point 40 to point 50 on BSL 20 is delimited as u1 where u1 is in units of LPI. Typically, the magnitude of u1 may be equal to that of u2

In some instances, u1 and u2 are perpendicular to each other.

In some examples, u1 and u2 can be used to generate a rotated lattice where $\|u1\|=\|u2\|$, where u1 is 45 degrees from u axis 70 and where u1 and u2 are perpendicular to each other.

Connecting point 40 and three neighbors, points 30, 50 and 60 in the resulting BSL 20 generated by points similar to exemplary point 40 may result in a square shape. The lattice may, as a result, be described as a square BSL. In some examples, BSL 20 need not be a square lattice.

BSL 20 may also have a u axis 70 and a v axis 80, as described above. In some examples, the minimum permissible moiré frequency $\Lambda 1$ may be equal to the height or length of the square generated by points 30, 40, 50 and 60.

In some examples, the color cyan in the screen set 10 may be represented by the two vectors where the two endpoints of each vector are a first point or the tail, lying at the origin, i.e., the intersection of u axis 70 and v axis 80 and where the other end point, or head, lies at any point defining the lattice. This is illustrated in 20, for example by the vectors $f_1^c$ and $f_2^c$.

For example, Cyan, in FIG. 3a may be delimited in frequency space as the two vectors $f_1^c$ and $f_2^c$ where $f_1^c$=u1+3u2, and $f_2^c$=−3u1+u2.

Similarly, Magenta in FIG. 3a may be delimited in frequency space as the two vectors $f_1^m$ and $f_2^m$ where $f_1^m$=3u1+u2, and $f_2^m$=−u1+3u2.

Yellow in FIG. 3a may be delimited in frequency space as the two vectors $f_1^y$ and $f_2^y$ where $f_1^y$=3u1, and $f_2^y$=3u2.

Black in FIG. 3a may be delimited in frequency space as the two vectors $f_1^k$ and $f_2^k$ where $f_1^k$=2u1+2u2 and $f_2^k$=−2u1+2u2.

For square and non-square BSL types the minimum permissible moiré frequency is equal to D where:

$$D=\min\{\|u1\|,\|u2\|,\|u1+u2\|\}.$$

Figure 3B:
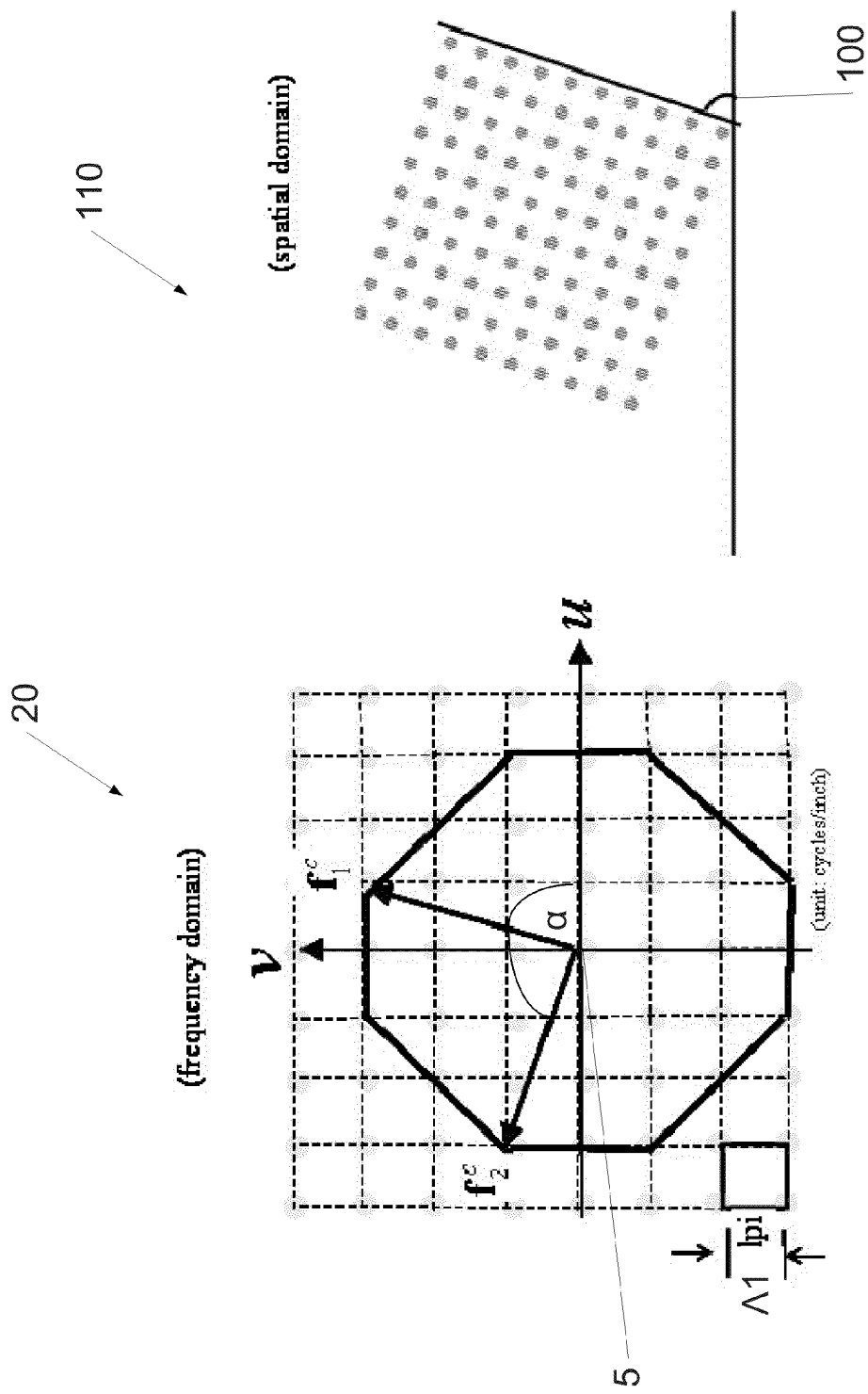
FIG. 3b is a schematic of one colorant from FIG. 3a represented in both frequency space and in the spatial domain, according to an example.

FIG. 3b is a schematic illustration of an exemplary color, cyan, in the proposed screen set.

FIG. 3b depicts both screen cyan in the frequency domain and the transposition of the vectors depicting screen set cyan in the frequency domain to the spatial domain, wherein the angle of rotation 100 of the cyan screen 110 is noted.

Angle of rotation 100 in the spatial domain may be related to the angle α of between origin 5 and frequency vector $f_1^c$ wherein angle 100=90°+α

In some examples, a cyan halftone screen can be depicted in frequency space on BSL 20. The vectors depicting cyan in frequency space are $f_1^c$=u1+3u2, and $f_2^c$=−3u1+u2 where units are in cycles/inch.

The corresponding halftone screen, in some examples, for digital printing, is as a result of the determination of the vectors in frequency space, positioned at an angle $\tan^{-1}(3)$=71.565 degrees rotation from the perpendicular. In some instances, the screen angle is confined to be the arc tangent of a rational number, due, in some examples, to the finite addressability of digital printers.

The other colorants depicted in FIG. 3a may similarly have corresponding halftone screens angles, for example, in digital printing. For example, yellow, represented by two vectors in frequency space $f_1^y$ and $f_2^y$, where $f_1^y$=3u1, and $f_2^y$=3u2, may correspondingly have a halftone screen angled at 0 degrees.

Black as represented in frequency space as the two vectors $f_1^k$ and $f_2^k$ where $f_1^k$=2u1+2u2 and $f_2^k$=−2u1+2u2 may correspondingly have a halftone screen, angled at $\tan^{-1}(1)$=45 degrees.

Magenta as represented in frequency space as the two vectors $f_1^m$ and $f_2^m$ where $f_1^m$=3u1+u2, and $f_2^m$=−u1+3u2 may correspondingly have a halftone screen angled at $\tan^{-1}(1/3)$=18.435 degrees.

Figure 4:
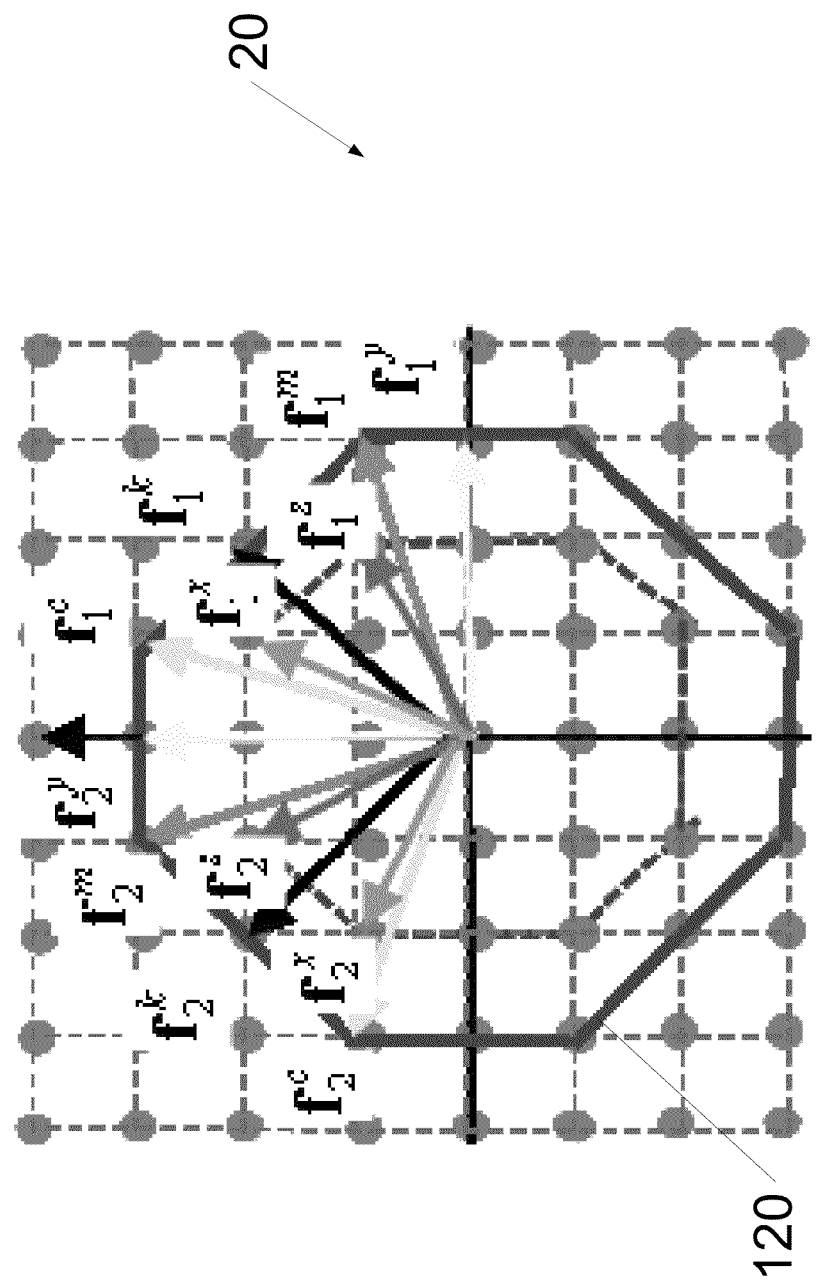
FIG. 4 is a schematic representation of a proposed screen set in frequency space for 6 colorants, according to an example.

FIG. 4 depicts a screen set geometry with 6 colors according to an example

FIG. 4 is similar to FIG. 3a described above with differences noted. BSL 20 in FIG. 4 is a square lattice, described above. FIG. 4 has 6 colors, each color represented by 2 vectors in frequency space, wherein each tail of each vector lies at the origin and each head of each vector lies at a point on BSL 20. In some examples, the head of each vector may not reach an edge of a bounding polygon 120. Similar to FIG. 3a, each of the 6 colors may be represented in frequency space by a set of two vectors, wherein the two vectors may correspondingly represent a halftone screen, of a screen set, at a specific angle for a digital printing of the screen. In FIG. 4, the two additional colors, represented by vectors $f_1^x$ and $f_x^2$ for colorant X and vectors $f_1^z$ and $f_2^z$ for colorant Z, may have corresponding halftone screens angled at $\tan^{-1}(2)$=63.435 degrees for colorant X and a $\tan^{-1}(0.5)$=26.565 degrees for colorant Z.

Figure 5:
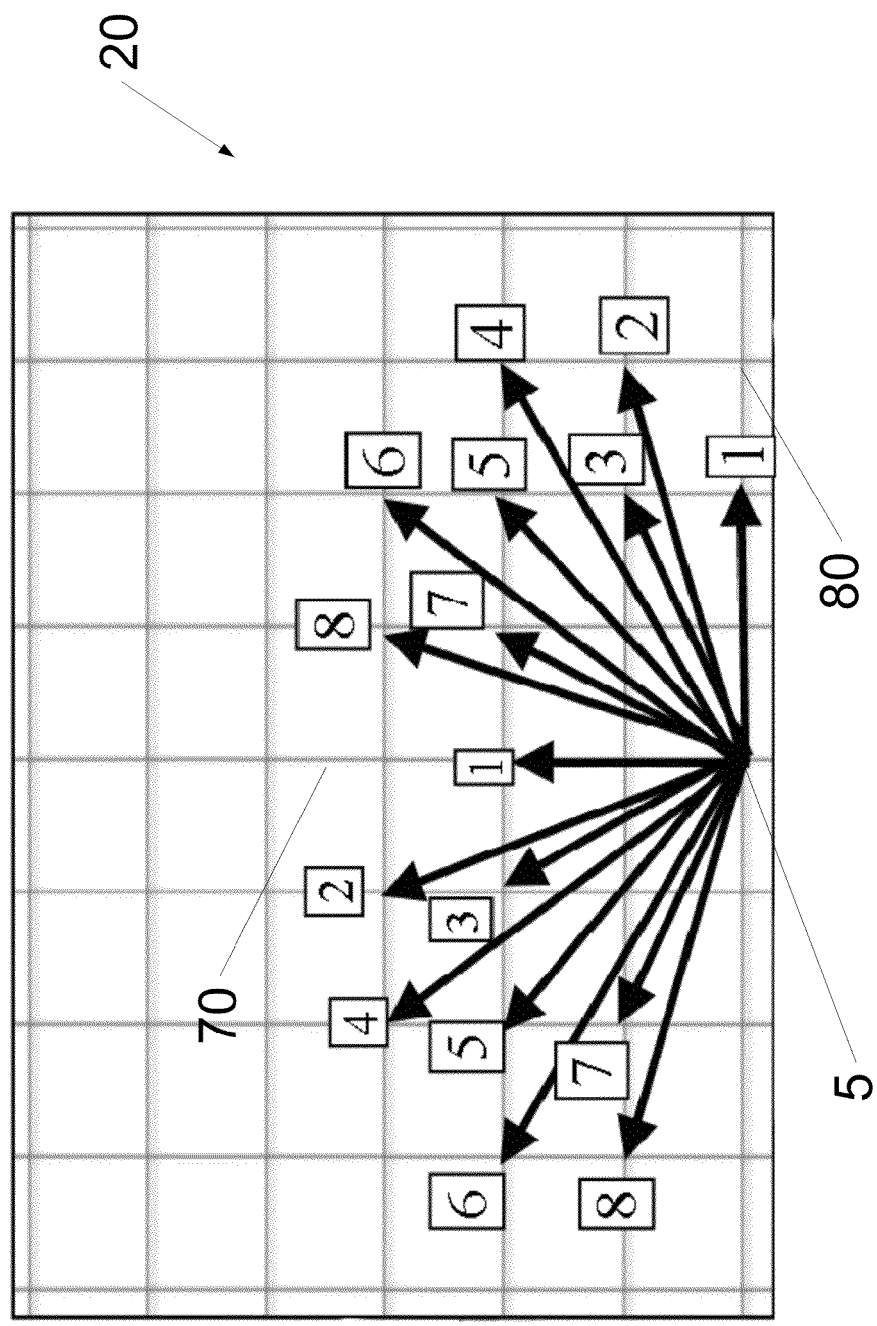
FIG. 5 is a schematic illustration of 8 colorants represented in frequency space on a basis spectral lattice, the colorants may be regular, semi-regular and non-regular screens in the spatial domain, according to an example.

FIG. 5 is a schematic illustration of 8 colorants represented in frequency space on a BSL 20, the colorants can be regular, semi-regular and non-regular screens in the spatial domain, if a lattice is chosen to yield the maximal number of regular separations.

In some examples, the printer printing the halftone screen set may have a resolution of 812.8 dots per inch, and a lattice size of $\Lambda 1$=81.28 lines per inch corresponding to a minimum permissible moiré frequency of 81.28 LPI.

The screens defined by this figure represent a combination of regular, e.g., where all cell centers are on pixel centers, so all cells are the same shape in gray levels with same number of pixels per cell, semi-regular and non-regular halftone screens. The screen set has been chosen to have the maximal number of regular screens in the permissible LPI range for this frequency lattice.

Regular screens for colors 1,2,3,7, and 8, are represented in spatial domain wherein $$N1 = \begin{bmatrix} 5 & 0 \\ 0 & 5 \end{bmatrix}, N2 = \begin{bmatrix} 3 & -1 \\ -1 & 3 \end{bmatrix}, N3 = \begin{bmatrix} 4 & -2 \\ 2 & 4 \end{bmatrix},$$

-continued $$N7 = \begin{bmatrix} 2 & -4 \\ 4 & 2 \end{bmatrix}, \text{ and } N8 = \begin{bmatrix} 1 & -3 \\ 3 & 1 \end{bmatrix}.$$

Semi-regular screens for color 5 are represented in spatial domain wherein $$N5 = \begin{bmatrix} 5/2 & -5/2 \\ 5/2 & 5/2 \end{bmatrix}.$$

Non-regular screens for colors 4 and 6 are represented in the spatial domain wherein $$N4 = \frac{10}{13} \begin{pmatrix} 3 & -2 \\ 2 & 3 \end{pmatrix}.$$

In some examples, a non-regular screen may be used in order to have more flexibility in halftone geometry such as screen angle and screen frequency. In some examples, regular screens may be used to avoid graininess in real prints.

FIG. 6a is a schematic illustration of a zero frequency square BSL depicting an interscreen frequency ratio, according to an example An interscreen frequency ratio may be defined as the ratio of the lengths of any two fundamental frequency vectors: one from one colorant plane and the other from a different colorant plane, where the larger length is placed in the numerator. In FIG. 6a, since $\|f_1^c\|=\|f_2^c\|>\|f_1^y\|=\|f_2^y\|$, the interscreen frequency ratios are.

$$\left\| \frac{f_1^c}{f_1^y} \right\| = \left\| \frac{f_2^c}{f_2^y} \right\| = \frac{\sqrt{1^2 + 2^2}}{2} = \frac{\sqrt{5}}{2} = 1.12$$

Figure 6B:
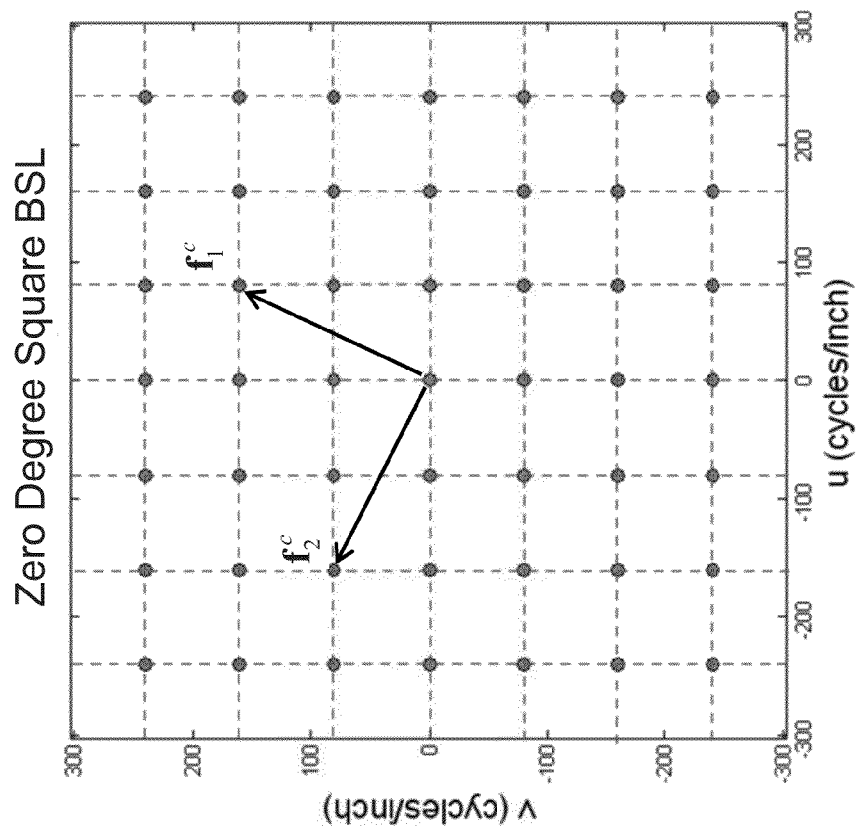
FIG. 6b is a schematic illustration of a zero frequency square BSL depicting an intrascreen frequency ratio, according to an example.

FIG. 6b is a schematic illustration of a zero frequency square BSL depicting an intrascreen frequency ratio, according to an example An intrascreen frequency ratio may be defined as the ratio of the lengths of two fundamental frequency vectors—both from same colorant plane, where the larger length is placed in the numerator.

In the example in FIG. 6b since $\|f_1^c\|>\|f_2^c\|$, the intrascreen frequency ratio is $$\left\| \frac{f_1^c}{f_1^c} \right\| = \frac{\sqrt{2^2 + 2^2}}{\sqrt{2^2 + 1^2}} = \frac{\sqrt{8}}{\sqrt{5}} = 1.26.$$

Figure 6C:
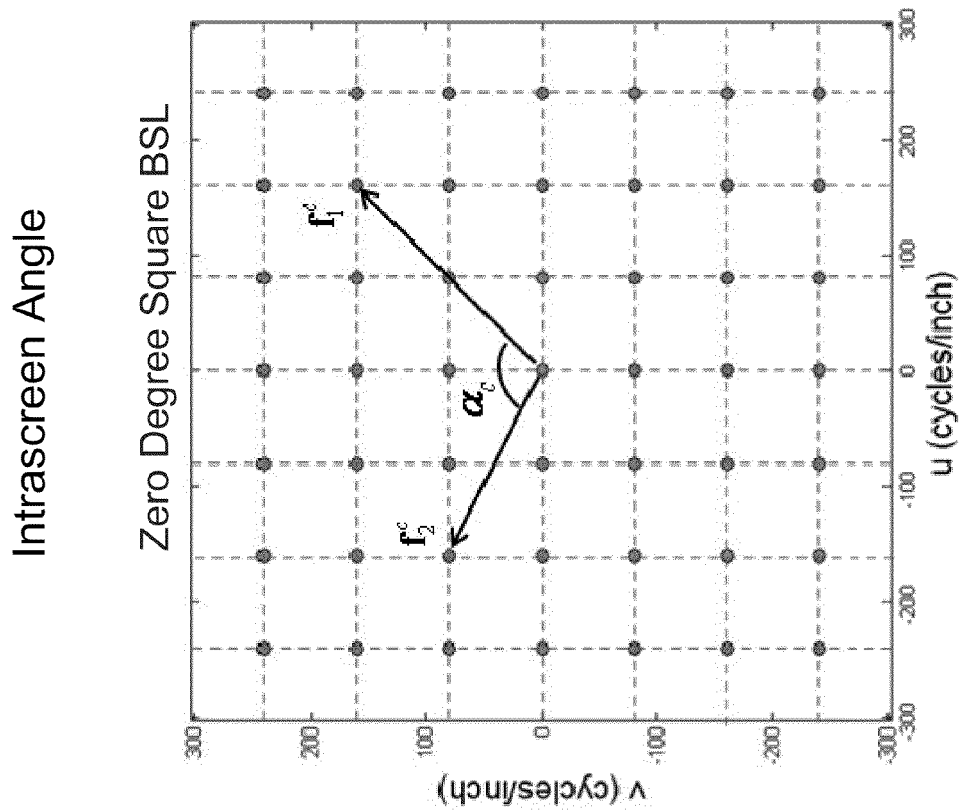
FIG. 6c is a schematic illustration of a zero frequency square BSL depicting an intrascreen angle, according to an example.

FIG. 6c is a schematic illustration of a zero frequency square BSL depicting an intrascreen angle, according to an example.

The intrascreen angle may be defined as the angle between two fundamental frequency vectors—both from same colorant plane. In the examples depicted in FIG. 6c, $\alpha_c$ is the intrascreen angle of a Cyan screen, which is $\alpha_c$=(180–atan(1/2))–atan(2/2)=180–26.57=108.43 degrees.

Figure 7:
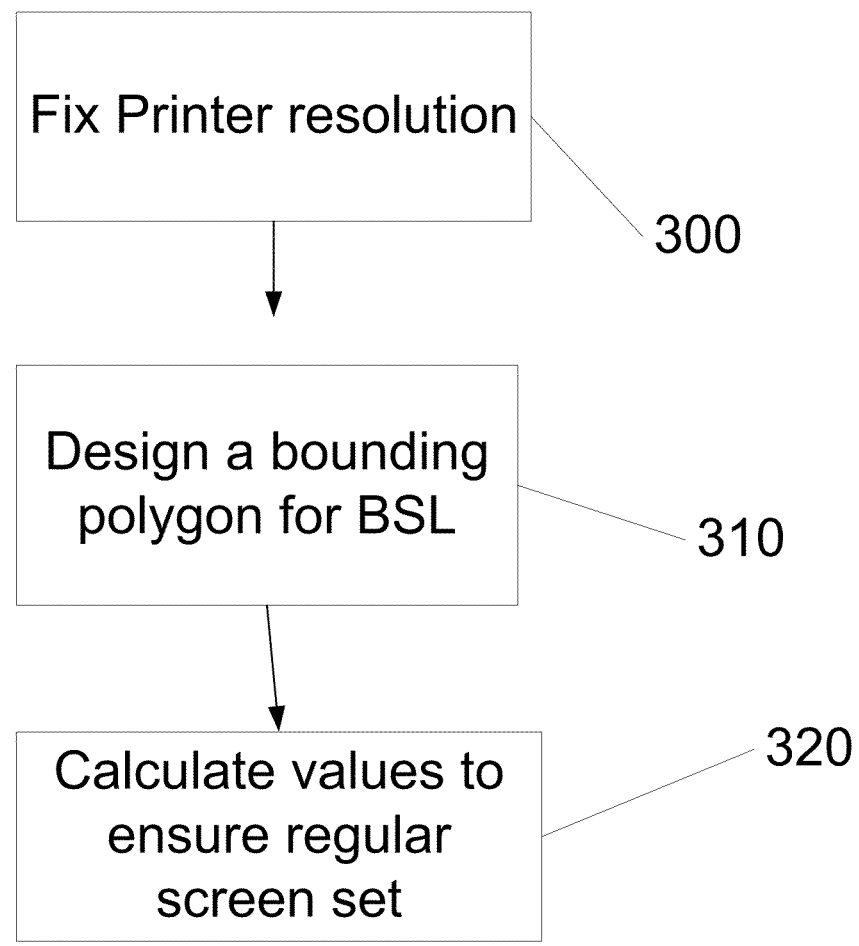
FIG. 7 is a flow diagram of a method for determining the lattice size such that it is moiré-free to all orders and have maximal number of regular separations, according to an example.

FIG. 7 is a method to generate a regular N-color screen set from a lattice, according to a method.

In some examples, a method may include choosing the maximal LPI range, e.g., between 150-320 LPI, and a lattice shape. The method may include mapping all possible frequency lattices with regular screens in the desired LPI, and removing lattices which are a subsample of other lattices, e.g. find all possible $\Lambda$ such that $\Lambda_i \neq n\Lambda_j$. For each lattice, it may be possible to map all relevant frequency screen vectors in the desired LPI. In some examples, once all relevant frequency screen vectors are mapped in the desired LPI, a method may, in some instances include choosing from a set of all relevant frequency screen vectors that are mapped in the desired LPI, a screen set according to certain properties. Those properties may include maximal symmetry properties, maximal angle differences, no zero-moiré effects at first order, having N colors in the screen-set, a maximal number of regular separations, a zero-angle only for the yellow separation or a high LPI screen.

In some examples, a printer resolution may be fixed as depicted in box 300. Using a BSL type lattice, a bounding polygon may be superimposed on the lattice, as depicted in box 310. In some examples, a bounding polygon may not be necessary and all vectors in the lattice that are inside the permissible screen LPI (lines per inch) may be used, as described in FIG. 10.

In some instances, a set of N pairs of fundamental frequency vectors may be chosen to satisfy one or more symmetry constraints ($M_{\chi^1}$–$M_{\chi^2}$) where $M_{\chi^i}$ is a 2×2 integer-valued matrix, e.g., a coefficient matrix, that is used to define the fundamental frequency vectors, as described below.

Other symmetry constraints may include the minimum inter-screen frequency ratio, where the inter-screen frequency ratio may be defined as the ratio of the lengths of any two fundamental frequency vectors: one from one colorant plane and the other from a different colorant plane, where the larger length is placed in the numerator as depicted in FIG. 6a.

Other symmetry constraints may include the minimum intra-screen frequency ratio, where the intra-screen frequency ratio may be defined as the ratio of the lengths of two fundamental frequency vectors—both from same colorant plane, where the larger length is placed in the numerator, as depicted in FIG. 6b The maximum deviation of the intra-screen angle from 90° may be determined by computing for each screen, the absolute value of the difference between the angle between the vectors for that screen and 90°. The maximum deviation of the intrascreen angle from 90° is the maximum of this set of values, as depicted in FIG. 6c.

In some examples, symmetry measures may be independent of the printer resolution, and the dot shape at each level of absorptance. In some examples, changing the scale of the BSL may not affect the result of the symmetry constraints. The N pairs may, in some examples, be found in the upper plane, above origin 5 on the BSL.

$\Lambda$ may be in units of lines/inch and represents the lattice size: $\Lambda_i=\|u_i\|$, irrespective of printer resolution; $\lambda$ may be in units of printer addressable pixels and represents the reciprocal lattice size, $$\lambda_i = \frac{\rho}{\Lambda_i}.$$

$\lambda_\chi^{min}$ may be the reciprocal lattice size for one colorant plane $\chi$ such that it is a regular screen, and may be represented in units of printer addressable pixels.

In the case of a square lattice without rotation, $$\lambda_\chi^{min} = \frac{\det(M_\chi)}{\gcd(m1, m2, m3, m4)}, \text{ where } M_\chi = \begin{pmatrix} m1 & m3 \\ m2 & m4 \end{pmatrix}$$

is the coefficient matrix in frequency space of screen $\chi$, i.e., $$F_\chi = M_\chi U = \begin{pmatrix} m1 & m3 \\ m2 & m4 \end{pmatrix} \begin{pmatrix} \vec{u}1 \\ \vec{u}2 \end{pmatrix},$$

det is the matrix determinant, and gcd is the greatest common divider.

The method may include, calculating values of lattice base vectors to ensure that the maximal number of the screens in the screen-set are regular as depicted in box 320. The calculations may include calculating the minimum value of $\lambda$ to ensure $\{N_{\chi^1}, \ldots N_{\chi^m}\}$ are regular screens.

For more than one regular screen matrix in the same screen-set, $\lambda_\chi^{min} = \text{lcm}(\lambda_{\chi^2}^{min} \ldots \lambda_{\chi^n}^{min})$, where the term lcm refers to the least common multiple.

In some examples, given a known printer DPI ($\rho$), $\Lambda$ may be calculated, where:

$\Lambda = \rho / \lambda_\chi^{min}$.

Figure 8:
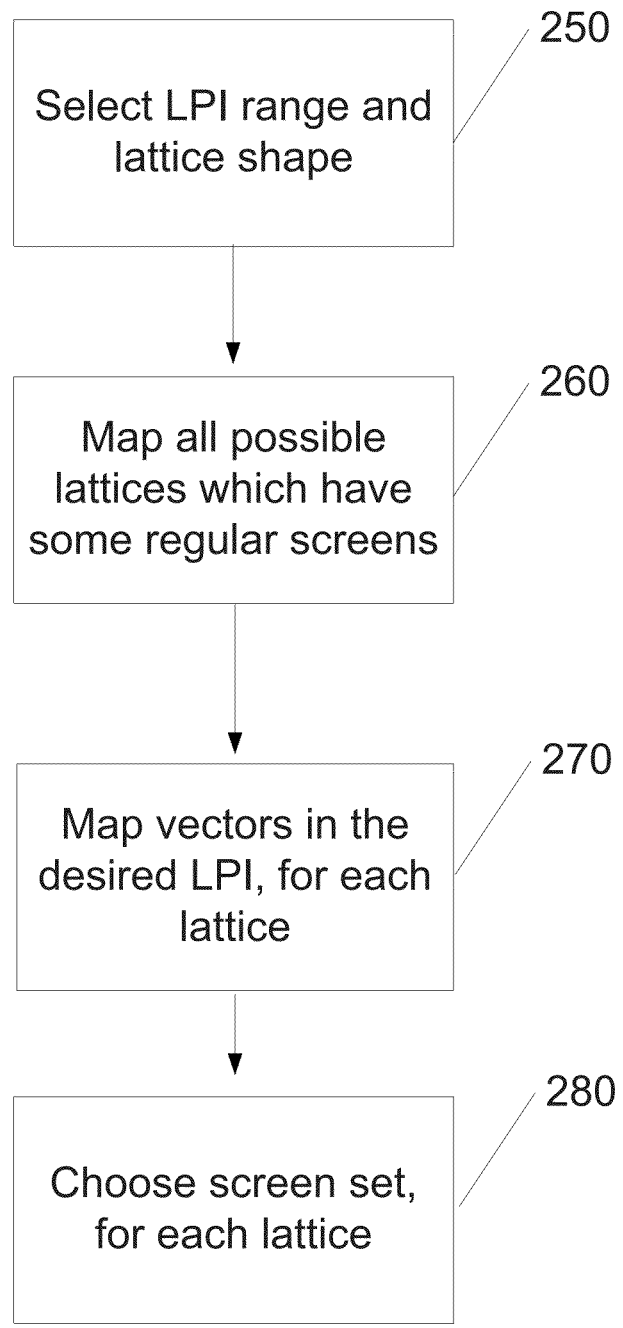
FIG. 8 is a flow diagram of a method for producing a moiré-free screen set, according to an example.

FIG. 8 is a schematic illustration of a method to design a moiré free screen set, according to an example.

Box 250 depicts a step in developing a moiré-free screen set, the step including selecting a maximal possible LPI range and a lattice shape in the frequency domain.

Box 260 depicts a subsequent step including mapping all possible lattices in the frequency domain, such that some of their screen vectors result in regular screens, as described above, in the range of a desired LPI.

Subsequent to mapping, all subsampled lattices are typically removed from the analysis such that $\lambda i \neq n\lambda j$, where these are the reciprocal lattice sizes of two different lattices.

Box 270 depicts a step in creating the screen set, which include mapping all frequency screen vectors in the desired LPI for each lattice in the analysis.

Once all frequency screen vectors have been mapped in the desired LPI, a screen set may be chosen according to the desired properties as depicted in Box 280, by choosing a sub-set of vectors in one of the lattices. Examples of desired properties are number of color planes, number of regular planes, high LPI screen, and other properties.

Figure 9:
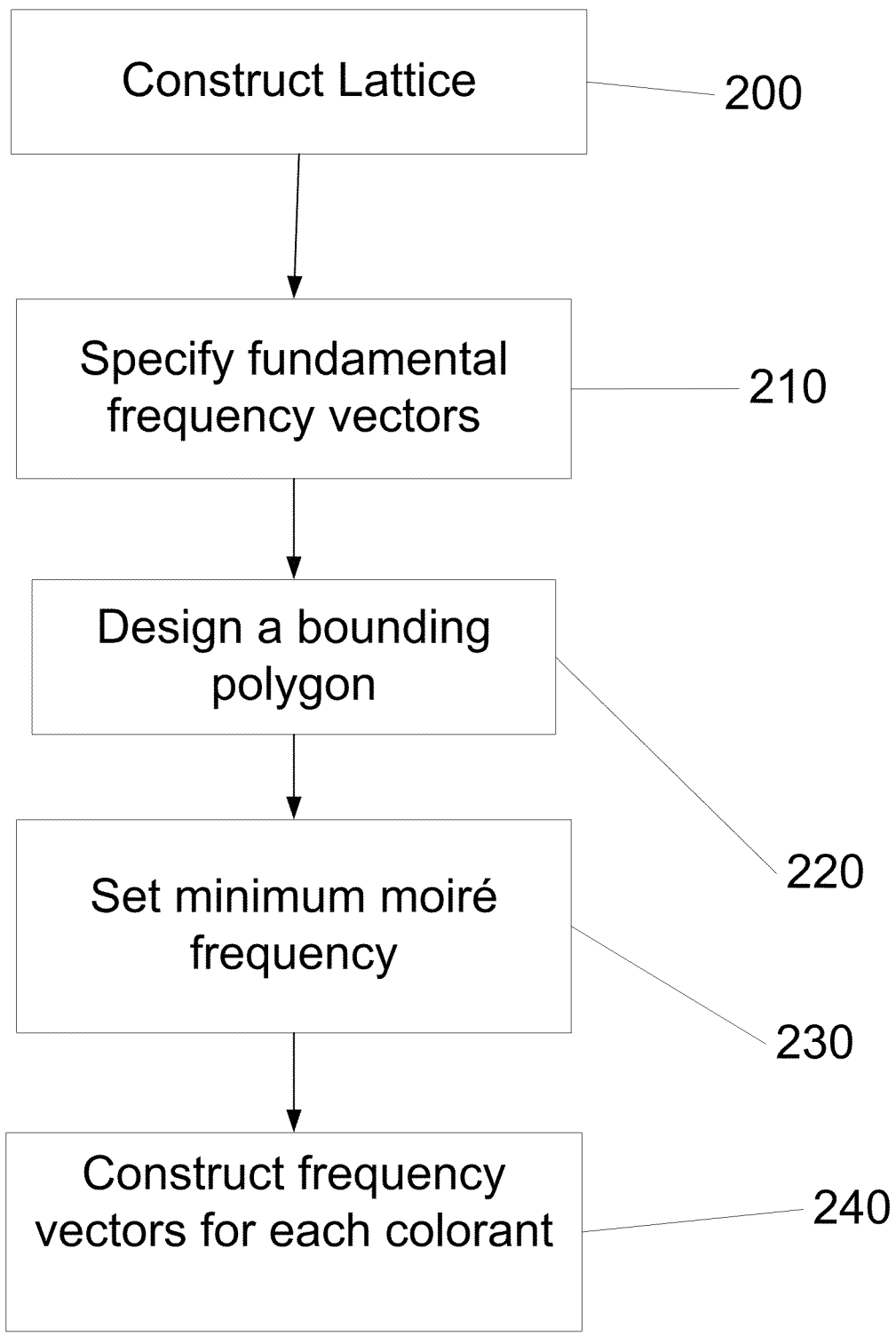
FIG. 9 is a flow diagram of a method for producing a moiré-free screen set, according to an example; and, FIG. 10 is schematic illustration of a method to generate a moiré-free to all-orders N-color screen-set by a lattice-based screen design, according to an example.

FIG. 9 is a flowchart of a method for a lattice based screen design. In some examples, the method is employed to generate the maximal number of regular screens for a given printer resolution, in some instances, in units of dots per inch (DPI). The method includes the determination of the minimum permissible moiré frequency of BSL 20 that leads to a screen set with maximal number of regular screens.

For the screen plane $\chi$, the screen vectors are $n^\chi 1$ and $n^\chi 2$ (in the spatial domain), and they are the cell grid base vectors, and measured in units of pixels or length (e.g. inches). The screen vectors can be written as a screen matrix, $N=[n^\chi 1|n^\chi 2]$. The Fourier transform of the screen vectors are $f^\chi_1$ and $f^\chi_2$ in the frequency domain, measured in frequency units, e.g. LPI, and the screen frequency matrix is $F=[f^\chi_1 | f^\chi_2]$.

If the screen is square, the absolute value of $f^\chi_1$ is equal to the absolute value of $f^\chi_2$, and $f^\chi_1$ is perpendicular to $f^\chi_2$.

The lattice may be generated using its base vectors u1 and u2, which can be written in a matrix, e.g., a BSL periodicity matrix (BSL-PM) where $F_A=[u1/u2]$, In order to avoid moiré to all orders, a lattice may be chosen such that $(\|\vec{u}1\|, \|\vec{u}2\|, \|\vec{u}1 \pm \vec{u}2\|) > f\min$, where f min is the the minimum frequency of moiré invisible to the human eye.

For a square lattice with rotation angle zero, $$F = \begin{bmatrix} \Lambda1 & 0 \\ 0 & \Lambda1 \end{bmatrix},$$

where $\Lambda1$ is in units of lines/inch.

For a rectangular with zero rotation angle BSL:

$$F_\Lambda = \begin{bmatrix} \Lambda1 & 0 \\ 0 & \Lambda2 \end{bmatrix},$$

as described with reference to FIG. 1*d*.

For a rotated square BSL:

$$F_\Lambda = \begin{bmatrix} \Lambda1 & -\Lambda2 \\ \Lambda2 & \Lambda1 \end{bmatrix},$$

where rotation angle $$\theta = \tan^{-1}\left(\frac{\Lambda2}{\Lambda1}\right)$$

as described with reference to FIG. 1*e*.

For a parallelogram BSL $$F_\Lambda = \begin{bmatrix} \Lambda1 & \Lambda3 \\ \Lambda2 & \Lambda4 \end{bmatrix},$$

as described in FIG. 1*f*.

And, where the lattice is generated using its base vectors u1 and u2, it can be written in a matrix called the BSL periodicity matrix (BSL-PM), which is given by $F_\Lambda=[u1|u2]$, In order to avoid moiré to all orders, a lattice may be chosen such that $(\|\vec{u}1\|, \|\vec{u}2\|, \|\vec{u}1 \pm \vec{u}2\|) > f\min$, where f min is the minimum frequency of moiré invisible to the human eye. This construction of the lattice is as depicted in box 200.

The second step of lattice-based screen design is to specify the screen frequency vectors, two for each individual colorant. Given the BSL-PM of a certain 2-D lattice type, each pair of screen frequencies $f_1^{\chi^1}$ and $f_2^{\chi^1}$, i.e., the two column vectors of the frequency matrices $F^\chi$ where $\chi 1$ is a colorant and the fundamental frequency components of the colorant $F^{\chi^1}$, are chosen as vectors from the lattice origin to one of its vertices. It can be expressed as $F^{\chi^1}=M_{\chi^1} F_\Lambda$ where $M_{\chi^1}$ is a 2×2 integer-valued matrix called the coefficient matrix that is used to define the two screen frequency vectors $f_1^{\chi^1}$ and $f_2^{\chi^1}$ for colorant $\chi^1$. This is depicted in box 210.

In some examples, a bounding polygon is chosen. The bounding polygon may provide better control over the spectral geometry, as depicted in box 220. In some examples, a bounding polygon may not be necessary and all vectors in the lattice that are inside the permissible screen LPI may be used.

In some instances, a bounding polygon is chosen on the fixed BSL first. In some examples, $(\|\vec{u}1\|,\|\vec{u}2\|,\|\vec{u}1\pm\vec{u}2\|)>f$ min, where in the case of a square lattice the condition is simplified to $\Lambda 1=\|\vec{u}1\|=\|\vec{u}2\|>f$ min, as depicted in box 230. In some examples, as a result, the range of all screen frequencies may be between 150 LPI and 320 LPI.

The bounding polygon may have an upper and lower half plane. In some examples, after designing the bounding polygon, only the upper half-plane of the bounding polygon may be employed to pick N pairs of fundamental frequency vectors, one pair per colorant. The lower half-plane of the bounding polygon may be reserved for conjugate (negative) frequency components corresponding to each frequency vector in the upper half-plane.

The multi-color halftone geometries is the set of angles and frequencies in units of lines per inch (LPI) of each screen plane; The geometry is not limited by octagon shapes or even any bounding polygon Frequency vectors corresponding to the N colorants may be constructed with either vertices or on an edge of the polygon, but must be located on the BSL, as depicted in box 240. Angle differences between individual screens for each colorant can be as small as e.g. 6 degrees, as long as all vectors are on the lattice.

Figure 10:
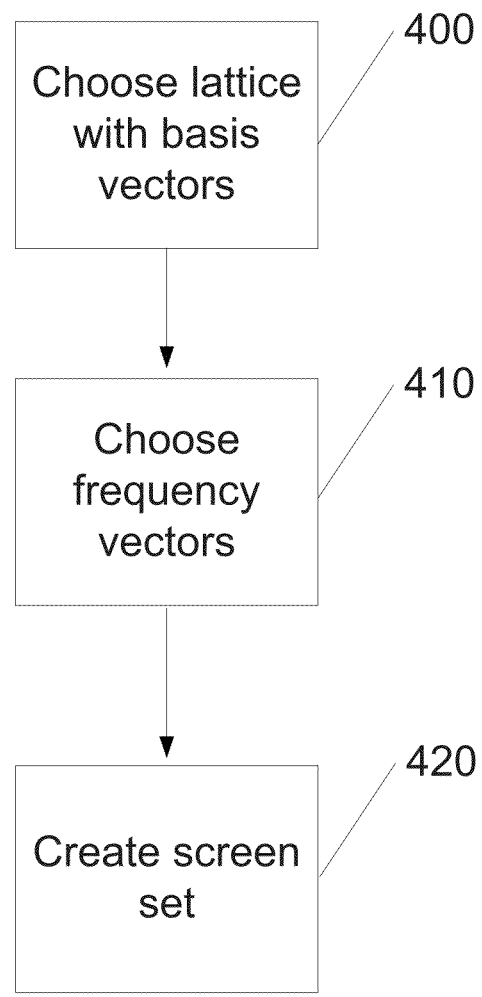

FIG. 10 is schematic illustration of a method to generate a moiré-free to all-orders N-color screen-set by a lattice-based screen design.

As depicted by box 400, the method includes choosing a lattice in frequency space with basis vectors u1 and u2 such that min $(\|\vec{u}1\|,\|\vec{u}2\|,\|\vec{u}1\pm\vec{u}2\|)>f$ min where f min is the minimum moiré invisible to the human eye.

Box 410 depicts a subsequent step, including, choosing a set of N pairs of fundamental frequency vectors on the vertices of this lattice to be the screen vectors.

Box 420 depicts creating a screen set based on angle between the origin described above and each of the fundamental frequency vectors.

Features of various examples discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method to generate a moiré-free to all-orders N-color screen-set by a lattice-based screen design, the method comprising:
choosing a lattice in frequency space with basis vectors u1 and u2 such that $(\|\vec{u}1\|,\|\vec{u}2\|,\|\vec{u}1\pm\vec{u}2\|)>f$ min, where f min is the minimum moiré invisible to the human eye, and choosing a set of N pairs of fundamental frequency vectors on the vertices of this lattice to be the screen vectors.

2. The method of claim 1, further configured to generate a screen-set with N>4 colors.

3. The method of claim 1, further configured to generate a screen-set with intra-screen angles, wherein all intrascreen angles approximate or are equal to 90 degrees.

4. The method of claim 1, further configured to generate a screen-set, the screen set having interscreen frequency ratios, wherein the inter-screen frequency ratios are minimized.

5. The method of claim 1, further configured to generate a screen-set, the screen set having intrascreen frequency ratios, wherein the intra-screen frequency ratios are minimized.

6. The method of claim 1, further configured to constrain the frequency vectors to a bounding polygon within the lattice in frequency space.

7. The method of claim 1, further configured to generate a screen set with one or a plurality of regular screens.

8. An apparatus performing the method of claim 1, or using a screen-set generated from the method of claim 1.

9. A system to generate a moiré-free to all-orders N-color screen-set by a lattice-based screen design the method comprising:
a processor, the processor configured to
choose a lattice in frequency space with basis vectors u1 and u2 such that $(\|\vec{u}1\|,\|\vec{u}2\|,\|\vec{u}1\pm\vec{u}2\|)>f$ min, where f min is the minimum moiré invisible to the human eye; and
choose a set of N pairs of fundamental frequency vectors on the vertices of this lattice to be the screen vectors.

10. The system of claim 9, the processor further configured to generate a screen-set with N>4 colors.

11. The system of claim 9, the processor further configured to generate a screen-set with intra-screen angles, wherein all intrascreen angles approximate or equal to 90 degrees.

12. The system of claim 9, the processor further configured to generate a screen-set, the screen set having interscreen frequency ratios, wherein the inter-screen frequency ratios are minimized.

13. The system of claim 9, the processor further configured to generate a screen-set, the screen set having intrascreen frequency ratios, wherein the intrascreen frequency ratios are minimized.

14. The system of claim 9, the processor further configured to constrain the frequency vectors to a bounding polygon within the lattice in frequency space.

15. The system of claim 9, the processor further configured to generate a screen set with one or a plurality of regular screens.

16. An apparatus performing the system of claim 9, or using a screen-set generated from the system of claim 9.

17. A non-transitory computer readable medium to generate regular N-color screen sets from a lattice based screen design, comprising instructions, which when executed cause a processor to:
choose a lattice in frequency space with basis vectors u1 and u2 such that $(\|\vec{u}1\|,\|\vec{u}2\|,\|\vec{u}1\pm\vec{u}2\|)>f$ min, where f min is the maximal visible moiré; and choose a set of N pairs of fundamental frequency vectors on the vertices of this lattice to be the screen vectors.

18. The non-transitory computer readable medium of claim 17, further comprising instructions which when executed, causes a processor to generate a screen-set with N>4 colors.

19. An apparatus performing the instructions of the on-transitory computer readable medium of claim 17 or using a screen-set generated from the non-transitory computer readable medium of claim 17.

20. The non-transitory computer readable medium of claim 17, further comprising instructions which when executed, causes a processor to generate a screen set with one or a plurality of regular screens.

* * * * *